United States Patent [19]

Poorbaugh et al.

[11] 4,045,682
[45] Aug. 30, 1977

[54] PHASE REVERSAL PROTECTION SYSTEM

[76] Inventors: Charles R. Poorbaugh, 1183 Kings Lane; Gerald A. Rhoads, 1335 S. 8th Ave., both of Yuma, Ariz. 85364

[21] Appl. No.: 683,788

[22] Filed: May 6, 1976

[51] Int. Cl.² ............................................. H02H 3/26
[52] U.S. Cl. ............................... 307/127; 318/207 R; 361/77; 318/445
[58] Field of Search .................. 318/207 R, 437, 445, 318/475, 489; 307/127; 361/77

[56] References Cited

U.S. PATENT DOCUMENTS

| | | | |
|---|---|---|---|
| 1,448,405 | 3/1923 | Huey | 361/77 |
| 1,691,433 | 11/1928 | Dresser | 361/77 |
| 3,214,664 | 10/1965 | Ishikawa | 318/207 R |
| 3,495,130 | 2/1970 | Bruner et al. | 307/127 X |
| 3,551,749 | 12/1970 | Hore | 318/207 R X |
| 3,708,719 | 1/1973 | Ishikawa | 307/127 X |

*Primary Examiner*—Gene Z. Rubinson
*Attorney, Agent, or Firm*—Cahill, Sutton & Thomas

[57] ABSTRACT

A three-phase motor system is described incorporating a small fractional horsepower three-phase control motor that is connected to rotate in a predetermined direction when a three-phase drive motor is rotating in a predetermined direction. A plurality of microswitches having actuating arms with cam follower portions are mounted with the arms contacting a cam plate. When the system is energized, the cam plate is rotated to open the microswitches if the rotation of the fractional horsepower motor is reversed. The microswitches, when opened, de-energize the fractional horsepower motor and concurrently prevent the closure of a solenoid-operated start switch to prevent energization of the drive motor.

5 Claims, 3 Drawing Figures

U.S. Patent  Aug. 30, 1977  4,045,682
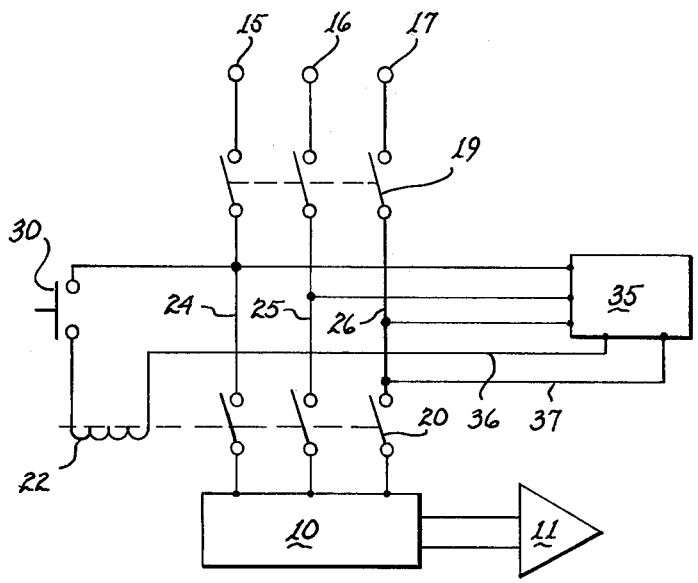
fig. 1
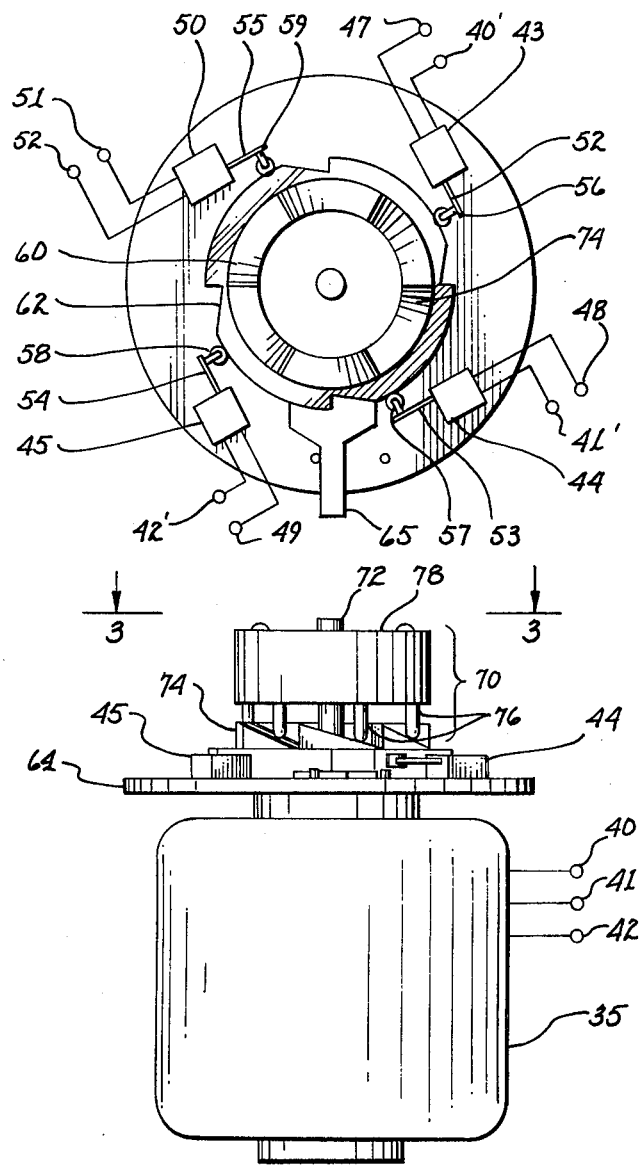
fig. 3
fig. 2

PHASE REVERSAL PROTECTION SYSTEM

The present invention pertains to phase detection systems and more particularly to the detection of the reversal of phase rotation in three-phase motors.

In many applications of three-phase motors, it is important that a predetermined direction of rotation be maintained and that no rotation in a reverse direction occur. Reverse rotation is not only undesirable but in many applications can cause severe damage; for example, irrigation pump motors require strict adherence to unidirectional rotation. Such pump motors are usually in the 100-HP category and are directly connected to various types of pumps for lifting water out of the well to the surface. Pumps, such as the commonly used turbine pump, are designed to be driven in only one direction and can be seriously damaged or destroyed if the direction of rotation is reversed. Such irrigation pumps are usually remotely located and are energized for periods of time separated by several days of inactivity. It is not uncommon for power interruptions to occur in the power system supplying such irrigation pump motors during the normal downtime of such pumps. At the end of such power interruptions when power again becomes available to the pump motors, the phase is sometimes reversed through the inadvertent interchanging of two of the three power lines.

Such phase reversals can also occur when pump motors are disconnected for repair or other local repairs, such as removal and replacement of transformers, is effected. To prevent the catastrophic effects of such phase reversal on pump motors, complex and expensive electrical and electronic equipment is available. Such prior art phase detection systems usually incorporate phase sensing apparatus combined with an electrically operated breaker system for interrupting the power to the pump motor if phase rotation is incorrect.

It is therefore an object of the present invention to provide a three-phase motor protection system for preventing the inadvertent reverse rotation of a three-phase motor.

It is also an object of the present invention to provide a system for preventing reverse rotation of a three-phase motor by connecting a second three-phase motor into the system for detecting phase reversal.

It is still another object of the present invention to provide a three-phase motor protection system incorporating a second three-phase motor for actuating switches to prevent the energization of the first three-phase motor.

These and other objects of the present invention will become more apparent to those skilled in the art as the description thereof proceeds.

Briefly, in accordance with the embodiment chosen for illustration, a three-phase drive motor, such as a pump motor is connected to a source of three-phase power through the energization of a solenoid-operated switch. The energization of the solenoid is controlled by the direction of rotation of a fractional horsepower three-phase control motor that is connected to the source of three-phase power. A cam plate is mounted on the control motor and is moveable between a "run" position and a "stop" position. Four microswitches are mounted in proximity to the cam plate with each switch being provided with an actuating arm having a cam follower portion contacting the cam plate. Three of the switches are connected in series with a different one of the three phase windings of the control motor; the fourth microswitch is connected in series with the solenoid winding of the solenoid switch. When the direction of phase rotation is proper, the control motor rotates in a predetermined direction and all four switches remain closed thereby permitting the energization of the solenoid winding and the subsequent energization of the three-phase drive motor. If the three-phase rotation is incorrect, the reverse rotation of the control motor is detected by a unidirectional coupling which rotates the cam plate to its stop position; in the stop position all four microswitches are "open" and power is interrupted to the windings of the control motor as well as the solenoid winding. When the phase is reversed, it is therefore impossible to start the three-phase drive motor.

The present invention may more readily be described by reference to the accompanying drawings in which:

FIG. 1 is a schematic circuit diagram showing the system of the present invention.

FIG. 2 is a side elevational view of a fractional horsepower three-phase control motor showing a unidirectional coupling mounted on the shaft thereof in accordance with the teachings of the present invention.

FIG. 3 is a top view of FIG. 2 with a portion thereof removed to reveal the cam plate of FIG. 2.

Referring now to FIG. 1, a three-phase drive motor 10 is shown connected to a turbine pump 11. The drive motor 10 is connected to a suitable source of three-phase power (not shown) such as the low side of a three-phase power transformer. The power is available at terminals 15, 16 and 17 and is applied to the motor 10 through an on-off switch 19 and a line switch 20. The on-off switch 19 is a manual switch that will usually be located at a control panel near the motor 10. The line switch 20 is solenoid-operated through the energization of solenoid winding 22. The solenoid winding 22 is energized by the application of current thereto from any two of the three conductors 24, 25 and 26 connected to the terminals 15, 16 and 17, respectively, through the on-off switch 19. A start switch 30 is connected in series with the solenoid winding 22 and is of the "self-latching" type; that is, the switch 30 is normally open and when closed is maintained in the closed position until power is interrupted. Such self-latching switches are well known in the art and need not be discussed here.

A three-phase control motor 35 is connected to each of the conductors 24, 25 and 26; the motor 35 may be a fractional horsepower motor since its sole purpose is to open switches, as will be described more fully hereinafter, in the event of a phase reversal. The solenoid winding 22 is connected in series with the switch 30 between conductors 24 and 26 through a microswitch (to be described in connection with FIGS. 2 and 3) via conductors 36 and 37. With reference to FIG. 1, the normal sequence of starting the drive motor 10 includes the closing of the on-off switch 19 which applies power to the control motor 35 but not to the drive motor 10. The self-latching start switch 30 is then closed to permit current to flow in the solenoid winding 22. If the control motor 35 is rotating in the predetermined direction, thus indicating the proper phase rotation, the solenoid winding 22 becomes energized and the line switch 20 closes to apply power to the drive motor 10. If the phase rotation is improper, the control motor 35 attempts to rotate in a reverse direction resulting in the opening of a microswitch (to be described in connection with FIGS. 2 and 3) to prevent current from flowing in the solenoid winding 22 and thus preventing the closure of the line switch 20.

Referring now to FIGS. 2 and 3, the fractional horsepower three-phase control motor 35 is schematically shown having input terminals 40, 41 and 42 each to be connected to one phase of a three-phase power system through microswitches 43, 44 and 45, respectively. For convenience of illustration, microswitch 43 is shown having a terminal 40' which in practice is connected to terminal 40 of the motor 35 thus placing the microswitch 43 in series with the motor winding connected to the terminal 40. Similarly, microswitch 44 is shown having a terminal 41' and microswitch 45 is shown having a terminal 42'. Therefore, each of the microswitches 43, 44 and 45 are connected in series with a different one of the windings of the three-phase control motor 35. Terminal 47 of microswitch 43 is connected to conductor 24, terminal 48 of microswitch 44 is connected to conductor 25 and terminal 49 of microswitch 45 is connected to conductor 26. When the microswitches 33, 34 and 35 are closed, power may then be applied to the windings of the three-phase control motor 35 through the respective microswitches.

Microswitch 50 is connected in series through terminals 51 and 52 with the solenoid winding 22 (FIG. 1) via conductors 36 and 37. Thus, when microswitch 50 is closed, current may flow through solenoid winding 22 when the start switch 30 is closed. Each of the microswitches 43, 44, 45 and 50 are provided with actuating arms 52, 53, 54 and 55, respectively, which include cam follower portions 56, 57, 58 and 59, respectively, contacting a cam plate 60.

The cam plate 60 includes a plurality of notches such as that shown at 62 for receiving the respective cam follower portions of the microswitch actuating arms. The cam plate 60 is mounted on a supporting platform 64 and is rotatable between a run position as shown in FIG. 3 and a stop position. The cam plate 60 may be rotated through the use of a manually positionable arm 65. When the cam plate 60 is in its run position as shown in FIG. 3, the cam follower portions of the respective actuating arms are in contact with the periphery of the cam plate out of the camming notches. If the cam plate 60 is rotated to its stop position (counterclockwise in FIG. 3), the camming portions of the respective actuating arms drop into corresponding notches in the cam plate. The microswitches 43, 44, 45 and 50 are closed when their respective actuating arms are in the positions shown in FIG. 3; if the cam plate 60 is rotated as described above, and the cam follower portions of the respective actuating arms drop into the notches in the cam plate, each of the microswitches is opened.

A unidirectional coupling device 70 is attached to the shaft 72 of the motor 35. The coupling device may take any of several forms and in the embodiment chosen for illustration incorporates a ratchet plate 74 which is attached to the cam plate 60. A plurality of pins 76 extend from a mounting block 78 and are urged by gravity into contact with the ratchet plate 74. The mounting block 78 is connected to the motor shaft 72 to be rotated therebetween.

When the control motor 35 is energized, and the direction of rotation is proper, the mounting block 78 rotates with the motor shaft 72 and the pins 76 ride over the ratchet plate 74. If the direction of rotation of the control motor is improper, the pins 76 engage the steps of the ratchet plate 74 and attempt to rotate the ratchet plate. Since the ratchet plate 74 is connected to the cam plate 60, the latter is rotated (counterclockwise in FIG. 3) from its run position to its stop position. Upon reaching the stop position, each of the microswitches 43, 44, 45 and 50 is opened, thus interrupting the power to the control motor 35 and simultaneously opening the circuit to the solenoid winding 22 of the line switch to thereby prevent the line switch from closing to apply power to the drive motor 10.

The system of the present invention has been found particularly desirable in remotely located irrigation pump applications. In such applications the drive motor is usually mounted with its shaft extending vertically into the well; the control motor may then be placed directly on the drive motor and adjusted so that its direction of rotation coincides with the direction of rotation of the drive motor. The control panel at such remote locations usually incorporate the necessary elements to complete the system of the present invention. It is only necessary to connect the switches in the windings of the control motor to the three-phase conductors in the control panel and connect the solenoid winding of the line switch through the microswitch mounted on the control motor. An operator attempting to start a pump motor would then follow his normal practice including placing the on-off switch 19 to the "on" position and depressing the self-latching start switch 20. If the direction of rotation is proper, the pump motor will start in its normal fashion. If there has been a phase reversal, the pump motor will fail to start and the control motor will momentarily start and immediately stop and thereafter will not be energized until the cam plate is manually "reset" or rotated from its stop position to its run position. Therefore, if the pump motor fails to start, the operator can immediately determine that the failure is due to a phase reversal; subsequently, appropriate interchanging of conductors can be undertaken to place the phase rotation in its proper direction.

What is claimed is:

1. In a three-phase drive motor system including a source of three-phase power wherein said motor is to rotate in only a predetermined rotational direction, means for preventing reverse rotation of said three-phase drive motor as a result of phase reversal of said power source comprising:

a. a three-phase control motor including three phase windings;

b. first, second and third switches each connected in series with a different one of the three phase windings of said three-phase control motor;

c. means connecting said three-phase control motor including said switches to said source of three-phase power to cause rotation of said control motor in a predetermined rotational direction when said drive motor rotates in said predetermined rotational direction;

d. a solenoid-operated switch, including a solenoid winding, connecting said source of three-phase power to the three-phase drive motor to energize said drive motor when said solenoid-operated switch is closed;

e. a fourth switch connected in series with said solenoid winding between two of the three phases of said source of three-phase power;

f. a cam plate having a run position and a stop position;

g. each of said first, second, third and fourth switches including actuating arms having a cam follower portion contacting said cam plate to close said switches when said cam plate is in said run position and open said switches when said cam plate is in said stop position; and h. means connected to the shaft of said three-phase control motor for moving said cam plate from said run position to said stop position when said three-phase control motor rotates in a reverse direction.

2. The combination set forth in claim 1 wherein said means connected to the shaft is a unidirectional rotational coupling.

3. The combination set forth in claim 1 wherein said means connected to the shaft comprise a mounting block having a plurality of spring-loaded pins extending therefrom, and wherein said combination includes a ratchet plate secured to said cam plate contacting said spring-loaded pins.

4. The combination set forth in claim 1 including a self-latching start switch connected in series with said solenoid winding.

5. The combination set forth in claim 3 including a self-latching start switch connected in series with said solenoid winding.

* * * * *